United States Patent [19]
Castillo

[11] Patent Number: 5,433,118
[45] Date of Patent: Jul. 18, 1995

[54] MAGNETIC TURBINE ROTOR FOR LOW FLOW FLUID METER

[75] Inventor: Juan B. Castillo, Zaragoza, Spain

[73] Assignee: Contadores de Agua de Zaragoza, Zaragoza, Spain

[21] Appl. No.: 164,334

[22] Filed: Dec. 10, 1993

[51] Int. Cl.⁶ .............................................. G01F 1/075
[52] U.S. Cl. .................................. 73/861.77; 335/303
[58] Field of Search ................ 73/861.77, 861.78; 335/303

[56] References Cited

U.S. PATENT DOCUMENTS

| | | | |
|---|---|---|---|
| 3,164,020 | 1/1965 | Groner et al. | 73/861.78 |
| 4,306,457 | 12/1981 | Fukui et al. | 73/861.77 |
| 4,555,685 | 11/1985 | Maruyama | 335/303 |
| 4,856,348 | 4/1989 | Hall | 73/861.78 |
| 5,313,159 | 5/1994 | Allwine, Jr. | 324/174 X |

FOREIGN PATENT DOCUMENTS

| | | | |
|---|---|---|---|
| 0147111 | 7/1986 | Japan | 73/861.77 |
| 2223593 | 4/1990 | United Kingdom | 73/861.77 |

Primary Examiner—Herbert Goldstein
Attorney, Agent, or Firm—Eliot S. Gerber

[57] ABSTRACT

An electronic fluid meter, such as a water meter, has a body through which the fluid flows, a rotor having magnetized blades and a sensor-transducer proximate the blades. The rotor is formed by injection-molding or sintering a mixture of a plastic resin and magnetizable particles, preferably strontium ferrite particles.

2 Claims, 1 Drawing Sheet

MAGNETIC TURBINE ROTOR FOR LOW FLOW FLUID METER

FIELD OF THE INVENTION

The present invention relates to electronic fluid meters and more particularly to magnetic turbine rotors in electronic water meters.

BACKGROUND OF THE INVENTION

In many areas the supply of potable water to the population and to industry is becoming a problem due to the increased use of water, scarcity of its existing supply, growth of population and rising standards of sanitation. Consequently, the costs of obtaining, transporting and treating potable water are increasing and the control of its consumption is of the utmost urgency. The most important way to conserve water is to accurately meter its usage and to charge for such usage.

The use of freely rotatable rotors in turbine fluid meters is shown in U.S. Pat. Nos. 4,500,579; 5,016,187; 5,187,989; 4,856,348; 4,798,092; 4,306,457; 3,636,767, incorporated by reference herein. In U.S. Pat. Nos. 4,700,579 and 4,856,348 each blade carries a magnetic slug (insert) whose movement past a sensor (transducer) is detected by a pickup coil. In U.S. Pat. No. 5,016,187 the rotor's rotation is detected and counted by a pickup assembly. In U.S. Pat. No. 4,798,092 the rotor has conductive blades made of "ferromagnetic or like material".

The invention refers to improvements in the rotors of fluid meters and especially an improvement in the magnetic rotors used in electronic water meters.

OBJECTIVES OF THE INVENTION

It is an objective of the present invention to reduce the mass of the turbine rotor in an electronic fluid meter so that it requires less energy for the rotation of the rotor. This provides an improvement in the sensitivity of the meter so that the meter is able to detect and measure very low flows of fluid.

It is a further objective of the present invention to provide a magnetic rotor which allows the direct generation of a variable magnetic field without utilizing auxiliary magnets or other means to achieve such goals.

SUMMARY OF THE INVENTION

The present invention is an improvement in fluid meters, particularly water meters, whose rotating turbine rotor blades generate a magnetic signal which is picked up by a sensor transducer. The mass of the turbine rotor is reduced by utilizing in its fabrication a mixture of plastic resin and magnetic material (ferromagnetic or paramagnetic material) which permanently retains a North or South magnetic field after being magnetized in a magnetic field. The rotors can be injection-molded or sintered (formed under heat and pressure from particles) in such a manner that the rotor movement provides a precise signal, in the meter, without the necessity of utilizing permanent magnets or other means to generate the varying magnetic fields.

The reduction of the mass of the rotor, and consequently the frictional inertia of its mounting, greatly increases the sensitivity of the meter and enables the meter to obtain correct readings at minimum flow rates, for example, as low as one-half gallon of water per hour. This measurement of low flow rate may be used to detect leaks in pipes, toilets, etc. and consequently would conserve water by alerting users of such leakage. In addition, it insures that those who use water at low flow rates are nevertheless accurately charged for such usage.

The rotor, including its blades, is fabricated with a lightweight plastic resin and magnetic material particle mixture that allows the blades to be permanently magnetized, therefore being capable of directly generating the necessary varying magnetic field without the necessity of auxiliary magnets on the rotor.

A consequence of the reduction in mass is a notable increment in the sensitivity of the meter, allowing for correct readings of flow rates much lower than are currently possible.

The rotor consists of a mixture of plastic resin material and a ferromagnetic or paramagnetic material. It is preferably manufactured by injection-molding or sinterization of a mixture of plastic and magnetic material, such as barium ferrite. The rotor blades are magnetized in a magnetic field to provide the orientation and magnetization of the magnetizable particles of the rotor. After such magnetization the rotor blades have the state of a permanent magnet with precise polarities.

The magnetization of the rotor can be achieved simultaneously with the injection or sinterization process, or after. Preferably the blades are magnetized after the rotor is formed.

The dimensions of the rotor, the nature of the magnetizable materials used in the mixture and its percentage and the intensity of the magnetic field, depend on the design and size of the rotor. as would the intensity of the magnetic field. However, a specific example is provided below.

Directly integrating the multipolar magnetism in the mass of the rotor eliminates the necessity in incorporating auxiliary elements (such as permanent magnets, spiral whorl ring, etc.) to achieve the movement signal necessary for measurement as in other electronic meters.

The rotor according to the present invention would have a smaller mass so that the inertia and the friction of the system is reduced to a minimum. The meter requires very little energy to function, i.e., very low flow of fluid, which provides an increment in the sensitivity of the meter. This meter realizes correct readings of water flow rates below the minimum limits set by regulating authorities.

BRIEF DESCRIPTION OF THE DRAWINGS

Other objectives and features of the present invention will be understood from the following detailed description of the invention taken in conjunction with the accompanying drawings. In the drawings.

DETAILED DESCRIPTION OF THE INVENTION

Figure 1:
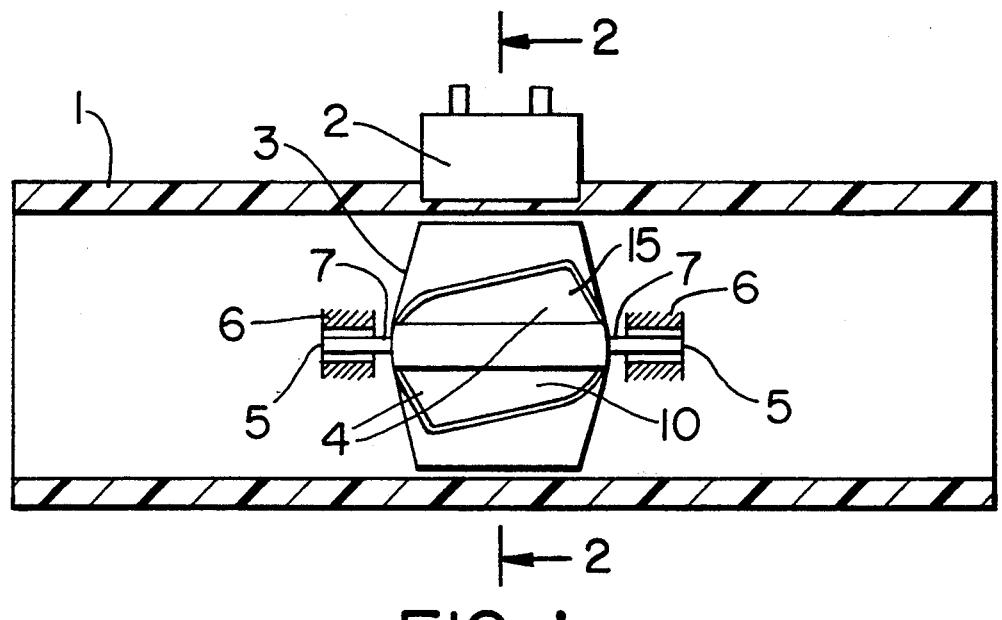
FIG. 1 is a cross-sectional view of the body and rotor of a electronic turbine water meter.

As shown in FIG. 1, the mechanism of the water meter includes a non-magnetic body 1 which is of a tubular configuration. Preferably the body 1 is of a strong and injection moldable plastic resin. Although not shown, body 1 is connected at its ends to an inlet pipe and an outlet pipe (tubes). A sensor transducer element 2 is mounted on body 1 and detects the magnetic field variations produced by the movement of the magnetized measuring part 3 ("magnetic rotary means").

Figure 2:
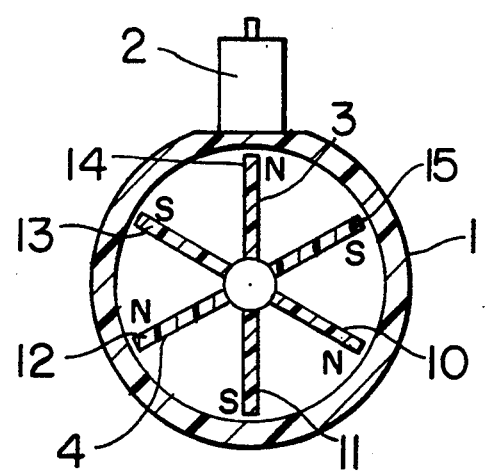
FIG. 2 is a transversal section corresponding to the cut line (cross section) A-B of the cut line of FIG. 1, showing the configuration of the turbine rotor.

The magnetized measuring part 3, according to the embodiment of FIGS. 1 and 2, is a turbine rotor. That rotor forms a mass and its blades have multipolar magnetism, as represented in FIG. 2. Alternative magnetic rotary means are a paddle wheel and a bucket wheel.

The rotor 3 has, at its two opposite ends, a shaft 7 having low friction tubular bearing surfaces which freely rotate within the bearings 6. Preferably the sensor element 2 is a Wheatstone magnetoresistive bridge whose resistive arms are thin Permalloy layers which respond to changes in magnetic field intensity by corresponding linear changes in resistance (Hall effect).

The rotor, shown in FIG. 2, has six blades. Each blade, in sequence, is magnetized in a different direction to form a magnetic pole. Blade 10 is N (North), blade 11 is S (South), blade 12 is N, blade 13 is S, blade 14 is N, and blade 15 is S.

A specific preferred example of a rotor for a water meter is as follows. The preferred plastic resin is polyformaldehyde acetal resin. Other suitable engineering plastic resins are ABS, polycarbonates, polysulfone and nylon. The plastic resin is mixed with the preferred magnetic material, which is a powder of barium ferrite (ferric powder). The plastic resin and barium ferrite are mixed together in the percentage proportion, by weight of plastic resin 50% and strontium ferrite 50%. If a stronger magnetic field is to be generated by the rotor, a greater percentage of the ferrite is used. That mixture is then sintered in a mold at a temperature of 235° C. and a pressure of 90 kg. per $cm^2$ for one minute.

The rotor blades are then permanently magnetized in a fixture in which a high voltage discharge is transmitted to copper coils having iron cores, with the coils positioned next to the rotor blades. A suitable high voltage discharge is 300–400 volts at 10,000 amps for 0.5–4 seconds, producing a magnetic field of 50–300 gauss, depending on the size of the rotor blades and the degree of the desired magnetization. The central ring of the rotor, from which the blades extend, is preferably not magnetized.

The measuring part 3 which constitutes the moving element in the meter can be constituted of turbine, rotor, etc., allowing the adoption of various configurations. It is capable of sending a magnetic signal (analog pulse) which is captured by a sensor. The sensor is connected to an electronic circuit which processes that electrical signal and preferably converts it to a digital code so that it can be displayed as a measured consumption of fluid passing through the tube.

The materials, shape, size and layout of the elements will be susceptible to variation and when these elements are varied do not cause an alteration in the essence of the invention or necessarily take the varied device outside of the scope of the subjoined claims.

I claim:

1. A turbine electronic fluid meter including a body portion through which flows the fluid to be measured, a rotor rotatably mounted in the body portion and having a plurality of blades, the rotor being adapted to be rotated by the flowing fluid, a shaft fixed on the rotor and within the body portion, bearing means to mount the shaft so that the shaft is freely rotatable, and a sensor-transducer mounted on the body portion proximate the rotor to convert movement of the blades into electrical signals;

wherein the rotor, including the blades, is injection-molded or sintered and consists of plastic resin and magnetizable particles mixed in said resin and the blades are magnetized;

wherein the magnetic blade portions are magnetized in regular sequence with a North magnetized portion being followed by a South magnetized portion; and wherein the sensor-transducer is a Wheatstone bridge having four arms, at least some of whose arms are magnetoresistive.

2. A fluid meter as in claim 1 wherein the magnetizable particles are strontium ferrite particles.

* * * * *